(12) United States Patent
Siche

(10) Patent No.: US 8,795,827 B2
(45) Date of Patent: *Aug. 5, 2014

(54) MULTILAYER SURFACE COVERING WITH BARRIER LAYER

(75) Inventor: Alexandre Siche, Wiltz (LU)

(73) Assignee: Tarkett G.D.L. S.A., Lentzweiler (LU)

( * ) Notice: Subject to any disclaimer, the term of this patent is extended or adjusted under 35 U.S.C. 154(b) by 188 days.

This patent is subject to a terminal disclaimer.

(21) Appl. No.: 13/376,407

(22) PCT Filed: Jun. 9, 2009

(86) PCT No.: PCT/EP2009/057107
§ 371 (c)(1), (2), (4) Date: Jan. 24, 2012

(87) PCT Pub. No.: WO2010/142325
PCT Pub. Date: Dec. 16, 2010

(65) Prior Publication Data
US 2012/0114931 A1    May 10, 2012

(51) Int. Cl.
*B32B 5/30* (2006.01)
*B32B 5/22* (2006.01)
*B05D 1/36* (2006.01)
*B05D 5/00* (2006.01)

(52) U.S. Cl.
USPC ........ 428/323; 428/317.9; 428/447; 428/500; 427/412.4; 427/243; 427/407.1

(58) Field of Classification Search
USPC ................... 428/317.9, 447, 425.5, 500, 323; 427/412.1, 243, 407.1, 412.4, 244
See application file for complete search history.

(56) References Cited

U.S. PATENT DOCUMENTS

| 8,586,146 B2 * | 11/2013 | Siche et al. ................. 427/412.1 |
| 2003/0072919 A1 * | 4/2003 | Watts et al. .................... 428/159 |
| 2012/0128876 A1 | 5/2012 | Siche et al. |

FOREIGN PATENT DOCUMENTS

| CA | 2 349 052 A1 | 2/2002 |
| JP | 2001-081216 A | 3/2001 |

* cited by examiner

*Primary Examiner* — Hai Vo
(74) *Attorney, Agent, or Firm* — Reinhart Boerner Van Deuren P.C.

(57) ABSTRACT

The present invention relates to a multilayer surface coating, including a PVC layer including inorganic fillers, said coating including a barrier layer including polyvinyl alcohol and a silane compound, said silane compound including at least one amine function.

16 Claims, 2 Drawing Sheets

MULTILAYER SURFACE COVERING WITH BARRIER LAYER

OBJECT OF THE INVENTION

The present invention relates to a PVC-based multilayer surface covering comprising a polyvinyl alcohol-based barrier layer.

BACKGROUND OF RELATED ART

For interior or exterior decoration of a surface, such as a building, a home or a vehicle, decorative polyvinyl chloride (PVC) based surface coverings are well known and widely used.

However, such "PVC" coverings have the drawback of being permeable to certain substances. In order to prevent or limit this phenomenon, while also preventing or limiting the penetration into the covering of dirt regardless of its nature, it was proposed to cover the outer surface of the upper and visible layer of the surface covering with a polyurethane type protective covering. However, this solution does not solve the problem of contaminants, present on the surface to be covered, from entering the covering, for example contaminants from a bituminous surface, or from the adhesive used to bond the covering to the surface. These contaminants migrate through the various layers of the surface covering, which leads to deterioration of mechanical performance characteristics and the aesthetic appearance of the covering.

In addition, for the manufacture of a PVC-based surface covering, and in particular a multilayer product, the manufacture of one or more layers of the covering involves the use of PVC recycled from old decorative surface coverings. Certain compounds, for example the pigments used in the decorative layer of these recycled coverings, can be found in the new covering using recycled PVC. In the case of pigments, they lead to deterioration of the aesthetic appearance and, generally speaking, a yellowing phenomenon of the covering.

In order to reduce or eliminate the yellowing phenomenon and to maintain the mechanical performance characteristics of a PVC-based covering, the use of a barrier layer was proposed. Generally speaking, it is a polyester-based or polyamide film or coating. Polyvinyl alcohol, well known for its barrier properties in packaging films is not used for a PVC layer owing to its low adherence to PVC, and particularly for a PVC layer including a significant amount of mineral fillers.

Classically, the doubling of a barrier film or the coating of a barrier composition is performed on at least one face of the surface covering, generally between the support layer and the wear layer, possibly between the support layer and the decorative layer of the decorative covering.

If a coating step does not pose specific problems, the use of film measuring 10 μm to 20 μm thick has the drawback of requiring a doubling step, which becomes particularly critical during the continuous manufacture of a surface covering that is 4 meters or 5 meters wide for example, since such barrier films are generally available only in widths of 2 meters or 3.5 meters.

In addition, the use of a polyester-based or polyamide barrier layer renders the recycling of the PVC-based coverings, which encase them, very difficult or even impossible owing to the need for special treatment that is not compatible or hardly compatible with the majority of the recycling processes involving PVC surface coverings.

PURPOSE OF THE INVENTION

The present invention proposes a solution that does not present the drawbacks of the prior art.

The present invention proposes a surface covering comprising a barrier layer that is an alternative to the barrier layers of the prior art and that is compatible with the recycling of the surface coverings that it contains.

It also seeks to provide a surface covering for which the mechanical performance characteristics and the aesthetic appearance are less altered over time.

SUMMARY OF THE INVENTION

The present invention describes a multilayer surface covering comprising a PVC-based layer, said layer comprising inorganic fillers, said covering comprising a barrier layer comprising polyvinyl alcohol and a silane compound, said silane compound comprising at least one amine function.

According to special embodiments, the surface covering according to the invention comprises one or more, or any combination of several of the following characteristics:
  the silane compound has the following formula:

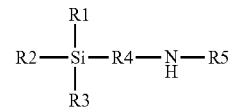

wherein $R_1$, $R_2$, $R_3$ are, independently from each other, either a hydroxyl group, a methoxy group, or an ethoxy group, and wherein $R_4$ is a $(CH_2)_n$ group, n being equal to 1, 2 or 3, and wherein $R_5$ is, independently of $R_1$, $R_2$, $R_3$, a hydrogen, a linear or cyclic alkyl, a phenyl, an amide group, or an aminoethyl group with the formula —$C_2H_4$—NH—$R_7$, $R_7$ being a hydrogen, an alkyl, a phenyl group, a benzyl group, or a vinyl-benzyl group,
  the silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N-(2-Aminoethyl)-3-aminopropyl-trimethoxysilane, N-(2-Aminoethyl)-3-aminopropyl-methyldimethoxysilane, N-2-(Benzylamino)-ethyl-3-aminopropyl-trimethoxysilane, N-2-(Vinylbenzylamino)-ethyl-3-aminopropyl-trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, and 3-Ureidopropyl-trimethoxysilane, Vinylbenzyl-aminoethyl-aminopropyl-trimethoxy silane,
  the silane compound represents between 6% and 40% by weight of the weight of the polyvinyl alcohol,
  said covering comprises a support layer and a wear layer,
  the barrier layer is located between the support layer and the wear layer and/or on the underside of the support layer,
  the PVC-based layer, preferably the support layer, is foamed,
  the PVC-based layer, preferably the support layer, is compact,
  said covering further comprises a polyurethane-based protective varnish,
  said covering being a floor covering,
  The present invention also describes a method for manufacturing a surface covering according to the invention, said method comprising a step of applying a composition comprising polyvinyl alcohol and a silane compound comprising at least one amine function, on at least one layer of said covering to form a barrier layer.

According to special embodiments, the method for manufacturing the surface covering according to the invention comprises one or more, or any combination of several of the following characteristics:

application of the composition is done by printing,
application of the composition is done over a width of 4 or 5 meters,
the composition is applied to form a barrier layer from 0.5 μm to 10 μm thick, when dry, in the multilayer covering,
the application of the composition is done on the topside and/or underside of the support layer of the multilayer covering,
the composition is prepared by preparing a mixture comprising 80% and 95% by weight of water, between 5% and 20% by weight of polyvinyl alcohol, and possibly between 0.4% and 1.5% by weight of a wetting agent, the mixture first being heated, between 90° C. and 95° C., prior to adding, while hot, the silane compound which represents between 6% and 40% by weight (per) in relation to the quantity of polyvinyl alcohol.

DETAILED DESCRIPTION OF THE INVENTION

Figure 1:
FIG. 1 schematically represents a PVC-based film or a non-foamable layer comprising a barrier layer.
Figure 2:
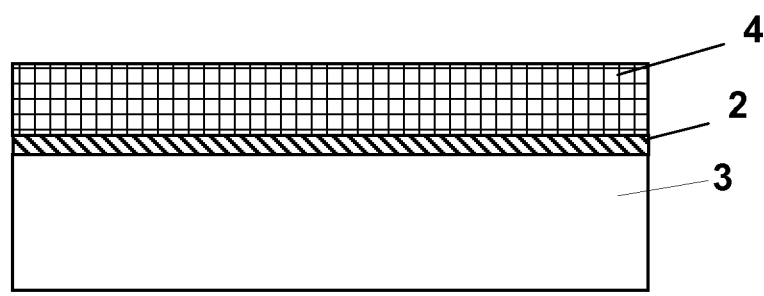
FIG. 2 schematically represents a first embodiment of a multilayer surface covering according to the invention, comprising a barrier layer.
Figure 3:
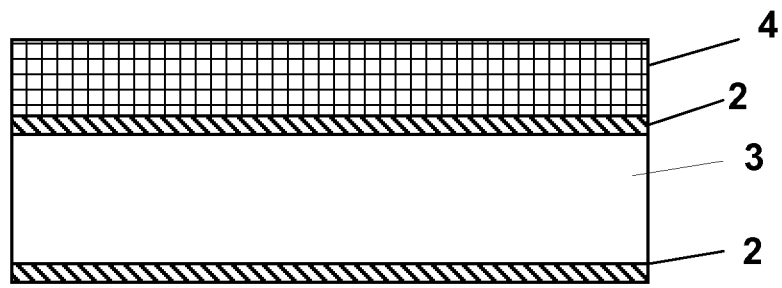
FIG. 3 schematically represents a second embodiment of a multilayer surface covering according to the invention, comprising a barrier layer.

The originality of the present invention is found in the use of a composition, comprising polyvinyl alcohol (PVOH) and a silane compound, as a barrier layer for a PVC-based surface covering, which is either non-foamable or foamed. It may concern a floor covering, wall covering or the interior surfaces of a vehicle, for example.

The application of polyvinyl alcohol on a PVC film, moreover containing fillers, first requires that it be rendered "compatible" with the PVC substrate, i.e. to increase its adhesion for the PVC. The modification of the PVC through the use of isocyanate type adhesives is not feasible as this solution is not only very expensive, it requires treatment of the film or the PVC layer in the mass and not on the surface. Furthermore, the use of isocyanates has the drawback of generating viscosity problems for the PVC layer and releasing toxic gaseous.

Surprisingly, it has been found that a composition comprising polyvinyl alcohol and a functionalized silane compound, offers good adhesion on a PVC film or layer, particularly on a PVC layer comprising inorganic fillers, while presenting a barrier effect against the rise of plasticizers and/or contaminants.

The composition, used for the barrier layer of the surface covering according to the invention, is an aqueous polyvinyl alcohol solution comprising a functionalized silane compound, said composition possibly comprising a wetting agent, said wetting agent preferably being of the polyether-siloxane type.

The composition is prepared by preparing a mixture comprising between 80% and 95% water by weight, between 5% and 20% polyvinyl alcohol by weight, and possibly between 0.4% and 1.5% wetting agent by weight. The mixture is first heated, for example between 90° C. and 95° C., prior to adding, while hot, for example at approximately 80° C., to the silane compound which represents between 6% and 40% by weight (per) in relation to the quantity of polyvinyl alcohol. The composition is stirred for approximately 60 minutes at approximately 95° C.

The silane compound is selected among the functionalized silane or silanol compounds, preferably silane or silanol compounds comprising at least one amine function.

Preferably, the silane compound has the following chemical formula:

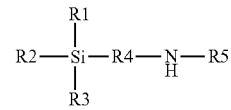

wherein $R_1$, $R_2$, $R_3$ are, independently of one another, either a hydroxyl group, a methoxy group, or an ethoxy group, and wherein $R_4$ is a $(CH_2)$, group, n being equal to 1, 2 or 3, and wherein $R_5$ is, independently of $R_1$, $R_2$, $R_3$, a hydrogen, a linear or cyclic alkyl, a phenyl, an amide group, or an aminoethyl group of the formula —$C_2H_4$—NH—$R_7$, $R_7$ being a hydrogen, an alkyl, a phenyl group, a benzyl group, or a vinyl-benzyl group.

The silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N-(2-Aminoethyl)-3-aminopropyl-trimethoxysilane, N-(2-Aminoethyl)-3-aminopropyl-methyldimethoxysilane, N-2-(Benzylamino)-ethyl-3-aminopropyl-trimethoxysilane, N-2-(Vinylbenzylamino)-ethyl-3-aminopropyl-trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, and 3-Ureidopropyl-trimethoxysilane, Vinylbenzyl-aminoethyl-aminopropyl-trimethoxy silane.

Examples of compositions referred to as barriers, according to the invention, are given in tables 1 and 2. The proportion of the components is given in percentages by weight in relation to the weight of polyvinyl alcohol (pcr).

TABLE 1

| | Composition examples | | | | | |
|---|---|---|---|---|---|---|
| | T | 1 | 2 | 3 | 4 | 5 |
| WATER | 809.1 | 809.1 | 809.1 | 809.1 | 809.1 | 809.1 |
| PVOH | 100.0 | 100.0 | 100.0 | 100.0 | 100.0 | 100.0 |
| Sil-1 | 0.0 | 6.0 | 12.5 | 20.0 | 30.0 | 40.0 |
| Wetting agent | 9.1 | 9.1 | 9.1 | 9.1 | 9.1 | 9.1 |

TABLE 2

Composition examples

|  | T | 6 | 7 | 8 | 9 | 10 |
|---|---|---|---|---|---|---|
| WATER | 809.1 | 809.1 | 809.1 | 809.1 | 809.1 | 809.1 |
| PVOH | 100.0 | 100.0 | 100.0 | 100.0 | 100.0 | 100.0 |
| Sil-2 | 0.0 | 6.0 | 10.0 | 12.5 | 15.0 | 20.0 |
| Wetting agent | 9.1 | 9.1 | 9.1 | 9.1 | 9.1 | 9.1 |

The polyvinyl alcohol is Elvanol® 90-50, Elvanol® 71-30, Elvanol® 70-75 by Dupont, or Exceval HR 3010, Exceval AQ 4104 by Kuraray.

The wetting agent is a polydimethylsiloxane polyether, for example BYK®-307 by BYK, or Tego® Wet 270 by Evonik.

The silane sil-1 compound is 3-aminopropyl-triethoxysilane, for example Z-6011 by Dow Corning®. The silane sil-2 compound is aminoethyl-aminopropyl-trimethoxysilane, for example Geniosil® GF9 or GF91 by Wacker, or Z-6020 by Dow Corning®.

Compositions comprising a functionalized silane compound, presenting an epoxy group, or presenting an alkyl group, as well as compositions comprising a mixture of a silane presenting an epoxy group, or an alkyl group, and a silane including at least one amine group, were also prepared (tables 3 and 4).

TABLE 3

Examples of compositions

|  | 11 | 12 | 13 | 14 | 15 | 16 |
|---|---|---|---|---|---|---|
| Water | 809.1 | 809.1 | 809.1 | 809.1 | 809.1 | 809.1 |
| PVOH | 100.0 | 100.0 | 100.0 | 100.0 | 100.0 | 100.0 |
| Sil-3 | 6.0 | 12.5 | 20.0 | 0.0 | 0.0 | 0.0 |
| Sil-4 | 0.0 | 0.0 | 0.0 | 6.0 | 12.5 | 20.0 |
| Wetting agent | 9.1 | 9.1 | 9.1 | 9.1 | 9.1 | 9.1 |

TABLE 4

Examples of compositions

|  | 17 | 18 | 19 |
|---|---|---|---|
| Water | 809.1 | 809.1 | 809.1 |
| PVOH | 100.0 | 100.0 | 100.0 |
| Sil-3 | 6.25 | 0.0 | 6.25 |
| Sil-4 | 0.0 | 6.25 | 6.25 |
| Sil-2 | 6.25 | 6.25 | 0.0 |
| Wetting agent | 9.1 | 9.1 | 9.1 |

The silane Sil-3 compound is glycidoxypropyltrimethoxysilane, for example Z6040 by Dow Corning®, and the silane Sil-4 compound is N-octyltriethoxysilane, for example 26341 by Dow Corning®.

The so-called "barrier" composition has the advantage of being easily applied on a PVC layer or film, for example by printing, rotogravure or a roller type covering device. It is thus possible to integrate the barrier layer installation step in the continuous surface covering manufacturing method, for 2 meter and 4 meter widths, and possibly even for greater widths.

To evaluate the adhesion of the composition on a PVC layer, comprising inorganic fillers or not, the composition is applied the form of a single-coat on different PVC-based layers, then dried, for example for one minute at 100° C., in order to form a film approximately 1 μm thick.

The adhesion of the barrier compound for the PVC is then evaluated by a method consisting of scratching the product with a six-tooth comb, then evaluating the peel resistance by means of TESA® 4124 type adhesive tape. The adhesion is considered to be good when no trace of film is torn away from the substrate. A "1" rating means that adhesion is good and a "3" rating means no adhesion. In the case of a sandwich structure, i.e. a barrier layer between two supporting layers of the same type, adhesion is evaluated by a peel resistance test in accordance with standard NF EN 431. The results are presented in tables 5 to 8.

TABLE 5

Adhesion of the compositions of table 1 on various PVC-based supports.

|  | T | 1 | 2 | 3 | 4 | 5 |
|---|---|---|---|---|---|---|
| Support layer made of recycled PVC, comprising fillers | 3 | 1 | 1 | 1 | 1 | 1 |
| Foamable PVC support layer, including fillers | 3 | 1 | 1 | 1 | 1 | 1 |
| Non-foamable PVC support layer, comprising fillers | 3 | 2 | 1 | 1 | 1 | 1 |
| PVC film comprising fillers | 3 | 1 | 1 | 1 | 1 | 1 |

TABLE 6

Adhesion of the compositions of table 2 on various PVC-based supports.

|  | T | 6 | 7 | 8 | 9 | 10 |
|---|---|---|---|---|---|---|
| Support layer made of recycled PVC, comprising fillers | 3 | 1 | 1 | 1 | 1 | 1 |
| Foamable PVC support layer, comprising fillers | 3 | 2 | 2 | 1 | 1 | 1 |
| Non-foamable PVC support layer, comprising fillers | 3 | 1 | 1 | 1 | 1 | 1 |
| PVC film comprising fillers | 3 | 1 | 1 | 1 | 1 | 1 |

TABLE 7

Adhesion of the compositions of table 2 on various PVC-based supports.

|  | 11 | 12 | 13 | 14 | 15 | 16 |
|---|---|---|---|---|---|---|
| Support layer made of recycled PVC, comprising fillers | 3 | 3 | 3 | 3 | 3 | 3 |
| Foamable PVC support layer, comprising fillers | 3 | 3 | 3 | 3 | 3 | 3 |
| Non-foamable PVC support layer, comprising fillers | 3 | 3 | 3 | 3 | 3 | 3 |
| PVC film comprising fillers | 3 | 3 | 3 | 3 | 3 | 3 |

TABLE 8

Adhesion of the compositions of table 3 on various PVC-based supports.

|  | 17 | 18 | 19 |
|---|---|---|---|
| Support layer made of recycled PVC, comprising fillers | 3 | 3 | 3 |
| Foamable PVC support layer, comprising fillers | 3 | 3 | 3 |
| Non-foamable PVC support layer, comprising fillers | 3 | 1 | 3 |
| PVC film comprising fillers | 3 | 3 | 3 |

The recycled PVC-based support layer, which was used in the adhesion evaluation, comprises 30% PVC by weight, 55% inorganic fillers and 14% plasticizer by weight.

The PVC-based foamable support layer, which was used in the adhesion evaluation, comprises 100 pcr of Pevikon®PVC P682 and Pevikon® DP 2170, 117 pcr of calcium carbonate (Omya BL 20) used as an inorganic filler, 2.9 pcr of a blowing agent, an azodicarbonamide (Porofor ADCL-C2), 1.38 pcr of zinc oxide (ZnO) used to lower the decomposition temperature of the blowing agent, 0.7 pcr of Titanium RC 82, 30.3 pcr of DIHP (Jayflex 77), 26.2 pcr of DIBP (Palatinol® IC), and 14.5 pcr of a dearomatized hydrocarbon used as a viscosity reducer (Exxsol D100), "pcr" referring to the percentage in relation to the quantity of PVC.

The PVC-based non-foamable support layer, used in the adhesion evaluation, comprises 100 pcr of Lacovyl PVC PB 1702 H, 156 pcr of inorganic filler (Omya BL20), 45 pcr of DIHP (Jayflex 77), 28 pcr of DIBP (Palatinol IC) and 5 pcr of viscosity reducer (Exxsol D100), "pcr" referring to the percentage in relation to the quantity of PVC.

The PVC film comprising inorganic fillers, which was used in the adhesion evaluation, comprises 100 pcr of Evipol PVC 6030, 100 pcr of calcium carbonate (Imerys Micronic P5) used as an inorganic filler and 33 pcr of DINP plasticizer by Exxon and 6 pcr of Lagor stabilizer (Lastab S DC 1211).

By comparing the various compositions tested and a control composition (a polyvinyl alcohol composition not containing a silane compound—composition T—), it appears that a composition comprising a functionalized silane compound, comprising at least one amine function, allows adhesion onto a PVC film or layer comprising inorganic fillers, whether or not the layer is non-foamable, or foamable and foamed.

Furthermore, compositions comprising a mixture of silane compounds, having different functionalities, do not improve adhesion.

Preferably, the functionalized silane compound represents between 6 and 40 pcr (percentage in relation to the polyvinyl alcohol). Advantageously, for a PVC-based non-foamable layer, the functionalized silane compound represents approximately 6 pcr, and for a PVC-based foamable layer, the functionalized silane compound represents approximately 20 pcr.

The adhesion of the composition in a so-called "sandwich" application between two support layers, was studied (table 8). An improvement in adhesion is noted. For a quantity of functionalized silane, comprising at least one amine function, of 15 pcr, the adhesion passes from 0 N/50 (mm) to 23 N/50 (mm) with a support layer 3 made of recycled PVC, comprising fillers and to 11 N/50 (mm) for a non-foamable PVC support layer 3.

TABLE 8

Adhesion (in N/50 (mm)) of compositions according to the invention of different supports.

| composition | T | 6 | 7 | 8 | 9 | 10 |
|---|---|---|---|---|---|---|
| Support layer made of recycled PVC, comprising fillers | 0 | 15 | 9 | 17 | 23 | inseparable |
| Non-foamable support layer made of PVC comprising fillers | 0 | 4 | 4 | 7 | 11 | 28 |

The composition according to the invention can be applied in a single-coat, or possibly in the form of several successive layers. The thickness of the barrier layer, or barrier layers, in the surface covering, is preferably between 0.5 µm and 10 µm, advantageously between 4 µm and 8 µm.

The very thin barrier layer has the advantage of allowing the PVC covering, which comprises such a barrier layer, to be compatible with conventional methods of recycling PVC coverings, and thus enables such coverings to be recycled.

Figure 4:
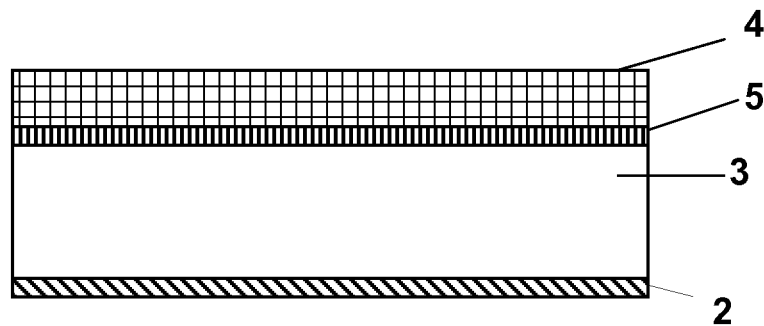
FIG. 4 schematically represents a third embodiment of a multilayer surface covering according to the invention, comprising a barrier layer.
Figure 5:
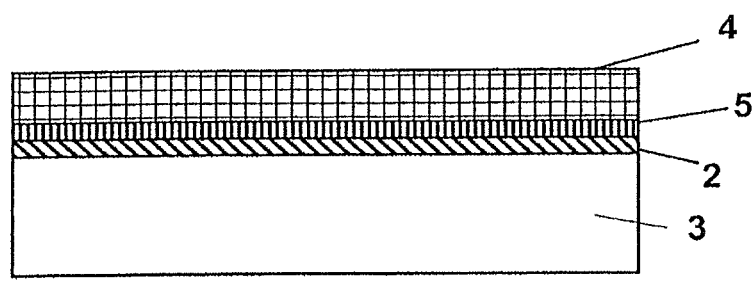
FIG. 5 schematically represents a fourth embodiment of a multilayer surface covering comprising a barrier layer.

The so-called "barrier layer" composition is applied on at least one of the layers of a multilayer covering (FIGS. 1 to 5). The composition is preferably applied to the PVC-based supporting layer 3 of a multilayer covering. A decorative layer 5 may possibly be applied either to the top portion of the support layer 3 (FIG. 4), or to the barrier layer 2 covering the support layer 3 of a multilayer covering (FIG. 5). Said decorative layer may be any suitable layer, preferably it is an ink or film comprising one or more decorative designs.

The barrier layer composition is applied to the underside of the support layer 3 and/or to the topside of the support layer 3. The term "underside" is understood as being the bottom portion of the support layer 3 that will enter into contact with the surface to be covered, on the understanding that the "topside" represents the top portion of the support layer 3 that will be in contact with the wear layer 4.

The support layer 3 may be non-foamable or foamable. In the case of an foamable support layer 3, said layer comprises one or more blowing agents, such as a sulfonyl hydrazone, for example P,P'-oxy bis benzene sulfonyl hydrazone, or an azodicarbonamide, for example Unifoam AZ ULTRA 7043 or Ultra 1050.

The barrier layer 2 provides good adhesion for the PVC layer on which it is applied, and presents a barrier effect by preventing the migration of plasticizers and/or contaminants through the surface covering, and more particularly toward the decorative layer 5 (FIGS. 4 to 5).

The barrier effect of the composition was evaluated by a tar test, which consists in placing liquid tar on the underside of the multilayer surface covering which comprises the barrier layer according to the invention, applied humid between 7 g/m$^2$ and 45 g/m$^2$ The tar is allowed to migrate for one week at a temperature of approximately 70° C. A rating between "1" and "5" is assigned based on the appearance of a stain on the topside of the floor covering. "1" means that there is no difference with a surface covering without tar, ratings "3" to "5" means that the surface covering has a color ranging from dark brown to black. The results are presented in table 9.

TABLE 9

Barrier effect.

| | No barrier layer | T 22 g/m$^2$ | 10 7 g/m$^2$ | 10 15 g/m$^2$ | 10 22 g/m$^2$ | 10 35 g/m$^2$ | 10 45 g/m$^2$ |
|---|---|---|---|---|---|---|---|
| on the underside of a non-foamable support layer. | 5 | 1 | 4 | 3 | 1 | 1 | 1 |

Preferably, the composition is applied humid to the support layer between 15 g/m$^2$ and 45 g/m$^2$, advantageously at approximately 22 g/m$^2$ or approximately 35 g/m$^2$.

In the surface covering, the barrier layer preferably has a thickness of at least 4 µm to 5 µm.

Preferably, the multilayer surface covering can also comprise a protective varnish, polyurethane-based for example, applied to the upper face of the wear layer 4.

The adhesion of the polyvinyl alcohol composition, whether or not it contains a functionalized silane compound, may also be improved through the use of a primer, that is first applied to the supporting layer 3. Preferably, the primer is a copolymer including acrylic acids, for example Neocryl® A 1131, or XK 151 by DSM), a polyurethane dispersion, for example Neorez R 989 by DSM), a polyisocyante dispersion, for example Bayhydur® VP LS 2240), or a combination of these compounds. The use a mixture of acrylic resin dispersions and PVC is also possible.

KEY

1: Non-expandable layer
2: Barrier layer
3: Support layer
4: Wear layer
5: Decorative layer

The invention claimed is:

1. A surface covering comprising a PVC-based layer, said layer comprising inorganic fillers, said covering comprising a barrier layer comprising polyvinyl alcohol and a silane compound, said silane compound comprising at least one amine function wherein the barrier layer is provided in proximity to the PVC-based layer.

2. The surface covering according to claim 1, wherein the silane compound has the following formula:

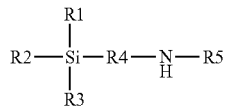

wherein $R_1$, $R_2$, $R_3$ are, independently from each other, either a hydroxyl group, a methoxy group, or an ethoxy group, and wherein $R_4$ is a $(CH_2)_n$ group, n being equal to 1, 2 or 3, and wherein $R_5$ is, independently of $R_1$, $R_2$, $R_3$, a hydrogen, a linear or cyclic alkyl, a phenyl, an amide group, or an aminoethyl group of the formula —$C_2H_4$—NH—$R_7$, $R_7$ being a hydrogen, an alkyl, a phenyl group, a benzyl group, or a vinyl-benzyl group.

3. The surface covering according to claim 1, wherein the silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N-(2-Aminoethyl)-3-aminopropyl-trimethoxysilane, N-(2-Aminoethyl)-3-aminopropyl-methyldimethoxysilane, N-2-(Benzylamino)-ethyl-3-aminopropyl-trimethoxysilane, N-2-(Vinylbenzylamino)-ethyl-3-aminopropyl-trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, and 3-Ureidopropyl-trimethoxysilane, and Vinylbenzyl-aminoethyl-aminopropyl-trimethoxy silane.

4. The surface covering, according claim 1, wherein the silane compound represents between 6% and 40% by weight of the total weight of the polyvinyl alcohol.

5. The surface covering according claim 1, wherein said PVC-based layer is a support layer and wherein said covering further comprises a wear layer.

6. The surface covering according to claim 5, wherein the barrier layer is located between the support layer and the wear layer and/or on the underside of the support layer.

7. The surface covering according claim 1, wherein said PVC-based layer is foamed.

8. The surface covering according claim 1, wherein said PVC-based layer is compact.

9. The surface covering according claim 1, wherein said covering further comprises a polyurethane-based protective varnish on the barrier layer.

10. The surface covering according to claim 1, said covering being a floor covering.

11. A method for manufacturing a surface covering according to claim 1, comprising a step of applying a composition comprising polyvinyl alcohol and a silane compound comprising at least one amine function in proximity to the PVC-based layer to form a barrier layer.

12. The method according to claim 11, wherein the application of the composition is done by printing.

13. The method according to claim 11, wherein the application of the composition is done over a width of 4 or 5 meters.

14. The method according to claim 11, wherein the composition is applied to form a barrier layer of 0.5 μm to 10 μm thick, when dry, in the covering.

15. The method according to claim 11, wherein the application of the composition is done on to the topside and/or underside of the PVC-based layer of the covering.

16. The method according to claim 11, wherein the composition is prepared by preparing a mixture comprising between 80% and 95% by weight of water, between 5% and 20% by weight of polyvinyl alcohol, and between 0.4% and 1.5% by weight of a wetting agent, the mixture first being heated, between 90° C. and 95° C., prior to adding, while hot, the silane compound which represents between 6% and 40% by weight in relation to the quantity of polyvinyl alcohol.

* * * * *